(12) United States Patent
Fruehauf et al.

(10) Patent No.: US 6,390,256 B1
(45) Date of Patent: May 21, 2002

(54) VEHICLE SUSPENSION SYSTEM

(75) Inventors: Frank Fruehauf, Aichwald; Ruediger Rutz, Koengen, both of (DE)

(73) Assignee: DaimlerChrysler AG, Stuttgart (DE)

(*) Notice: Subject to any disclaimer, the term of this patent is extended or adjusted under 35 U.S.C. 154(b) by 0 days.

(21) Appl. No.: 09/601,700

(22) PCT Filed: Jan. 14, 1999

(86) PCT No.: PCT/EP99/00171
§ 371 Date: Oct. 17, 2000
§ 102(e) Date: Oct. 17, 2000

(87) PCT Pub. No.: WO99/39930
PCT Pub. Date: Aug. 12, 1999

(30) Foreign Application Priority Data

Feb. 4, 1998 (DE) .......................................... 198 04 288

(51) Int. Cl.⁷ ................................................ F16F 13/00
(52) U.S. Cl. ......................... 188/314; 188/298; 188/315
(58) Field of Search ......................... 188/314, 315, 188/297, 298; 267/64.28

(56) References Cited

U.S. PATENT DOCUMENTS

| | | | |
|---|---|---|---|
| 3,955,807 A | 5/1976 | Takahashi et al. | |
| 4,275,900 A | 6/1981 | Andreoli et al. | |
| 4,364,582 A | 12/1982 | Takahashi et al. | |
| 4,697,674 A | * 10/1987 | Tangorra | 188/298 |
| 4,896,752 A | * 1/1990 | Shtarkman | 188/315 |
| 5,016,909 A | * 5/1991 | Lin | 188/314 |
| 5,016,911 A | * 5/1991 | Takehara et al. | 188/314 |
| 5,477,947 A | * 12/1995 | Schales et al. | 188/298 |
| 5,593,007 A | * 1/1997 | Siltanen | 188/314 |

FOREIGN PATENT DOCUMENTS

| | | |
|---|---|---|
| EP | 0 348 286 | 12/1989 |
| FR | 2 362 017 | 3/1978 |

* cited by examiner

*Primary Examiner*—Matthew C. Graham
(74) *Attorney, Agent, or Firm*—Crowell & Moring LLP

(57) ABSTRACT

A springing system for a vehicle has a hydraulic actuator and a storage element which holds hydraulic fluid. The system is constructed as a gas accumulator with a holding chamber for the hydraulic fluid and a separate gas chamber, and communicates with the actuator via a connecting line. In order to construct a hydropneumatic springing system for vehicles with a largely linear spring behavior up to complete relief of the load, a further storage element is connected to the actuator via a connecting line and is constructed as an elastomeric accumulator.

20 Claims, 3 Drawing Sheets

VEHICLE SUSPENSION SYSTEM

BACKGROUND OF THE INVENTION

The present invention relates to a springing system for a vehicle having a hydraulic actuator and a storage element which holds hydraulic fluid, is constructed as a gas accumulator with a holding chamber for the hydraulic fluid and a separate gas chamber, and communicates with the actuator via a connecting line.

EP 0 427 046 A1 discloses a hydropneumatic springing system for a vehicle, which comprises a hydraulic setting cylinder between a wheel suspension and the structure of the vehicle in each case, the cylinder communicating with a gas accumulator. The two pressure chambers on either side of the piston of the setting cylinder are connected to the hydraulic fluid holding chamber of the gas accumulator. Thereby, during a movement of the piston of the setting cylinder, the hydraulic fluid is forced into the holding chamber of the gas accumulator or conveyed out of this. The holding chamber of the gas accumulator is separated from a gas chamber in the gas accumulator via a diaphragm, the compressible gas that is acted on by the hydraulic fluid via the diaphragm effecting a soft and elastic spring behavior in accordance with the gas characteristic curve; with increasing loadings, the gas characteristic curve runs progressively.

This hydropneumatic springing system has the disadvantage that it is not possible to relieve the load completely on the pneumatic gas accumulator. The gas accumulator is prestressed with a predefined pressure, and if the pressure falls below the prestress, the backing force drops off abruptly and force transmission is no longer possible. The result of this is that when a wheel is relieved of load, for example when travelling around curves, there is the risk that the unloaded spring strut will come into the range of an impermissibly low pressure below the prestress.

With the aid of a control concept, in which by way of a pump/motor device, hydraulic fluid is deliberately fed to the more highly loaded spring struts, depending on the degree of loading, it is certainly possible to avoid hazardous and unstable driving states. For example, swaying movements, in particular swaying oscillations, with increasing loading of the wheel on the inside of the curve and on the outside of the curve are prevented. In the event of failure of the regulation, however, this system does not offer any adequately safe emergency running behavior.

U.S. Pat. No. 3,955,807 describes a hydraulic spring strut of a vehicle, whose hydraulic chamber is connected to a storage element in which an elastomer is arranged. The elastomer in the storage element separates a hydraulic chamber from a gas chamber. During a dipping movement of the spring strut, hydraulic medium is forced into the hydraulic chamber of the storage element, and at the same time the elastomer is displaced in the direction of the gas chamber. Because of the different compressibilities of the gas in the gas chamber and of the elastomer, and because of the series connection of gas chamber and elastomer, the result is a nonlinear characteristic curve determined by the specific properties of the gas and of the elastomer.

This design has the disadvantage that a linear, Hookeian spring behavior cannot be simulated, because of the nonlinear gas properties. In addition, complete relieving of the load on the pneumatic gas accumulator is not possible with this design either.

FR-A-23 62 017 shows a springing system having two parallel gas/hydraulic accumulators, which are connected via a connecting line, in which there is an adjustable valve. Because of the difference in size between the two gas/hydraulic accumulators, different characteristic curves can be activated as a function of the loading acting on the springing system. However, because of the gas-specific properties, it is still only possible to implement a nonlinear springing behavior. On the other hand, a linear springing behavior is not possible.

U.S. Pat. No. 4,896,702 shows a spring leg which is comparable with that from FR-A-23 62 017. Depending on the movement of the springing, in each case one of the two gas/hydraulic accumulators is acted on. The springing behavior is also nonlinear.

The invention is based on the problem of developing a hydropneumatic springing system for vehicles with a largely linear spring behavior up to complete relief of the load.

According to the invention, this problem has been solved by providing a further storage element which is connected to the actuator via a connecting line and is constructed as an elastomeric accumulator.

The use of the additional elastomeric storage element achieves an approximately linear characteristic curve of the springing system up to complete relief of the load. The elastomer has a linear spring behavior in accordance with Hooke's law, the spring constant being adjustable through the selection of the elastomer, depending on the desired stiffness.

The elastomeric accumulator supplements the gas accumulator, in particular at low loading. In the case where the elastomeric accumulator and the gas accumulator are arranged in parallel, and both accumulators are connected to the setting element via a common hydraulic fluid connecting line, the spring behavior of the accumulators can be matched to each other in such a way that the work is distributed between accumulators. At low loadings, a back-pressure is built up in the elastomeric accumulator and, in particular in the case of swaying movements, contributes to stable driving behavior. Under high loads, the elastomer expediently rests on a supporting housing and makes no contribution to the springing, which is then carried out exclusively by the gas accumulator. Because of the soft spring behavior of the gas accumulator, in this case in particular low-frequency structure oscillations can be cushioned.

In this case, the gas accumulator is expediently connected to the actuator via its own connecting line and assumes the function of a balancing accumulator, in particular of a central balancing accumulator for a number of actuators in a vehicle.

The balancing accumulator and the elastomeric accumulator are acted on in a frequency-selective manner in the passive system, in that low-frequency oscillations are fed to the balancing accumulator and higher-frequency oscillations are fed to the elastomeric accumulator. The frequency selection is advantageously carried out via a pump/motor device, which is arranged in the flow path between the balancing accumulator and the actuator and, because of its inherent dynamics in passive operation, essentially transmits only low frequencies up to the inherent frequency to the balancing accumulator. These frequencies correspond approximately to the typical frequencies of the vertical structure oscillations. At the same time, damping is achieved by restricting the volume flow in the pump/motor device. Higher-frequency are no longer transmitted to the balancing accumulator, because of the inertia of the pump/motor device, but are transmitted only to the elastomeric accumulator.

Because of the linear spring behavior of the elastomer, the latter is particularly well suited to active springing systems, for example to prevent or to overcompensate for swaying oscillations when travelling around curves. Depending on the regulation concept, however, further system degrees of freedom, such as dipping, lifting movements, self-steering behavior or a load-independent basic level of the springing can be influenced.

The springing system is expediently regulated via the pump/motor device, it being possible for either speed regulation or volume flow regulation to be used. If an electric motor is used in the pump/motor device, its speed is regulated. On the other hand, the volume flow of the fluid stream delivered by the pump is regulated if the pump/motor device is driven by the internal combustion engine of the vehicle at an advantageously constant speed.

It is preferable for at least two actuators to be connected together, by the two actuators of one axle or the diagonally opposite actuators front left/rear right or front right/rear left being acted on by a common pump/motor device. For each overall system, comprising elastomer accumulators, actuators and a pump/motor device, a central gas accumulator can be provided as a balancing accumulator. This system is hydraulically autonomous, the pump/motor device also running permanently and actively influencing the springing behavior or, in emergency operation, acting as a frequency divider. In addition, the passively operated pump/motor device can also act as a generator, by the pump, which is expediently constructed as an internal-gear pump, being operated by the hydraulic flow and driving the electric motor.

In order to achieve damping of oscillations going beyond increasing the flow resistance, a restrictor is advantageously arranged in the connecting line between the elastomeric accumulator and/or the gas accumulator, it being possible for this restrictor to be constructed as a fixed restrictor or also variably adjustable.

The actuator is preferably a bellows, in particular a rolling bellows or a folding bellows. The bellows is distinguished by a particularly low-friction behavior, as a result of which the lowest possible proportion of energy is dissipated.

BRIEF DESCRIPTION OF THE DRAWINGS

Other objects, advantages and novel features of the present invention will become apparent from the following detailed description of the invention when considered in conjunction with the accompanying drawings wherein.

DETAILED DESCRIPTION OF THE DRAWINGS

Figure 1:
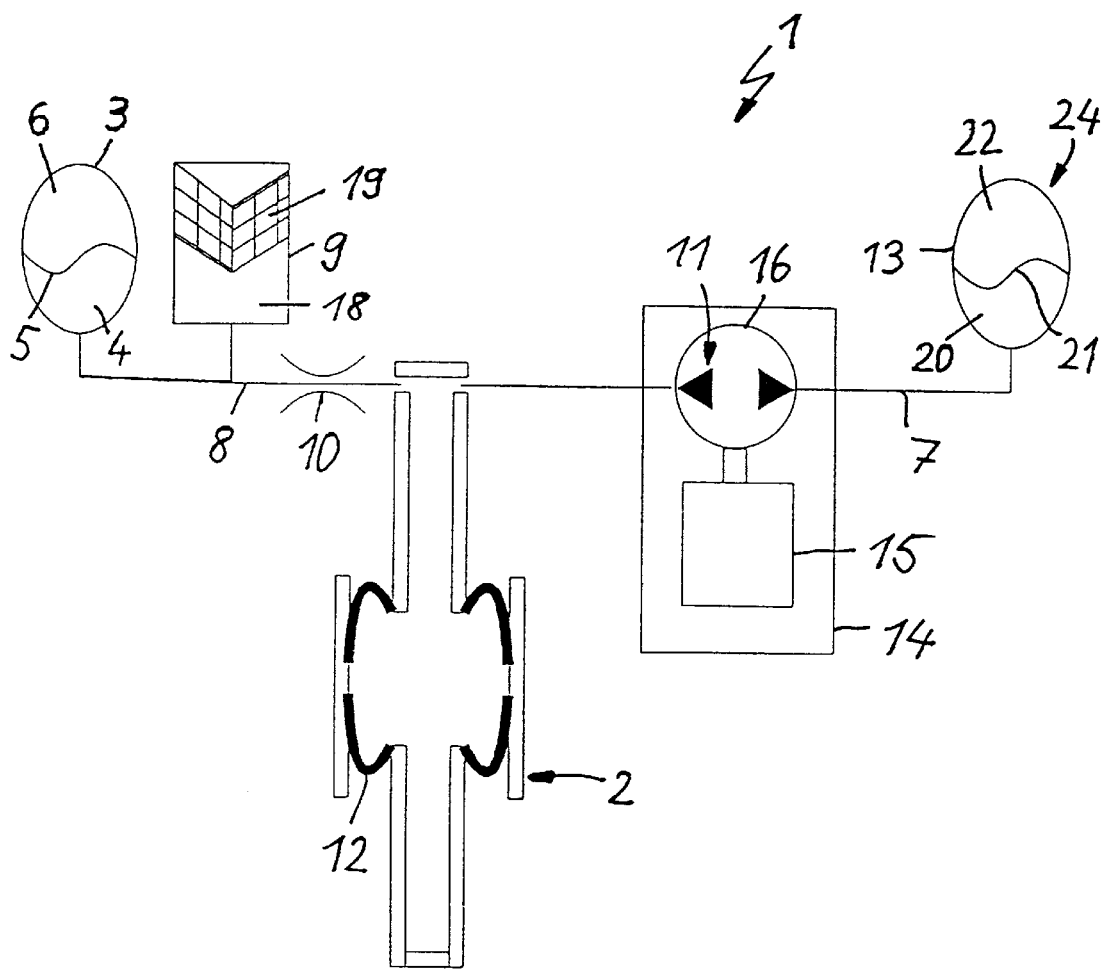
FIG. 1 is a schematic illustration of a springing system according to the present invention.

FIG. 1 illustrates a springing system 1 which is used in commercial vehicles, omnibuses or passenger cars. The springing system 1 is constructed as a hydropneumatic springing system and contains a hydraulic actuator 2, which is connected to an elastomeric accumulator 9 via a hydraulic connecting line 8. The elastomeric accumulator 9 comprising a housing with a holding chamber 18 to hold the hydraulic fluid and an elastomer 19, which is either sealed off from the holding chamber 18 via an impermeable, displaceable diaphragm or covers the entire housing cross section. The elastomers considered are commercially available materials with a Hookian spring behavior, for example rubber.

If, on account of a vertical force component, the actuator 2 is displaced, the hydraulic fluid is forced into the holding chamber 18 via the connecting line 8 or is led out of the holding chamber 18, and the elastomer 19 is compressed or relieved of load. The spring action of the elastomer 19 takes place linearly, according to Hooke's law of force, complete, continuous relief of load down to zero being possible.

Arranged in the connecting line 8, as an oscillation damper between the actuator 2 and the elastomeric accumulator 9, is a restrictor 10, which is expediently constructed as a fixed restrictor. However, if appropriate a variably adjustable restrictor is also considered.

Arranged parallel and directly adjacent to the elastomeric accumulator 9 is a gas accumulator 3, which is supplied with hydraulic fluid via the same connecting line 8 and has a holding chamber 4 for the hydraulic fluid, as well as a gas chamber 6 which is divided off from the holding chamber 4 by a diaphragm 5. The springing behavior of the gas accumulator 3 and the behavior of the elastomeric accumulator 9 are coordinated so as to supplement each other. The gas accumulator 3 acts as a spring above its prestress; in this range, the elastomeric accumulator does not make any contribution, since the elastomer is expediently completely compressed and cannot act as a spring. Below the prestress of the gas accumulator 3, the latter does not transmit any spring force, which is then produced only via the elastomer acting as a spring in this range. As a result of the combination of the elastomeric accumulator 9 and gas accumulator 3, an approximately linear spring characteristic curve over the entire loading range is produced.

If appropriate, a shut-off valve can be provided (see FIG. 3), in order to isolate the gas accumulator 3 from the springing system, for example in order to avoid a springy behavior at high curve dynamics.

The actuator 2 is designed as a cylindrical bellows 12, particularly as a low-friction rolling bellows in the embodiment shown. According to a design which is not shown, the bellows 12 can also be a folding bellows.

The springing system 1 is assigned a balancing accumulator 24 in the form of a gas accumulator 13 having a further holding chamber 20 for hydraulic fluid, a gas chamber 22 and an intermediate diaphragm 21. The balancing accumulator 24 communicates with the actuator 2 via a hydraulic connecting line 7. Arranged in the flow path between the setting element 2 and the balancing accumulator 24, for an active behavior of the springing system 1, is a pump/motor device 14 which, according to an expedient design, has an electric motor 15 whose speed can be regulated and a pump 16 operated by the electric motor 15, in particular an internal-gear pump, to deliver the hydraulic fluid. Depending on the delivery direction of the pump 16, hydraulic fluid is drawn from the holding chambers 4, 18 of the gas accumulator 3 and/or the elastomeric accumulator 9 and the actuator 2 and fed to the balancing accumulator 24 or, in the opposite direction, hydraulic fluid is drawn from the balancing accumulator 24 and fed to the elastomeric accumulator 9 and/or the gas accumulator 3 as well as the actuator 2.

If hydraulic fluid is fed to the gas accumulator 3 and the elastomeric accumulator 9 as well as the actuator 2, the pressure is increased in the system comprising the setting element 2, gas accumulator 3 and elastomeric accumulator 9. Because of the higher pressure level, higher forces can be transmitted, for example in the spring strut on the outside of the curve when travelling around curves. At the same time, a lower pressure prevails in the balancing accumulator 24.

If, conversely, hydraulic fluid is drawn from the gas accumulator 3 and the elastomeric accumulator 9 as well as the actuator 2, the pressure falls and the forces which can be transmitted are lower, for example in the spring strut on the inside of the curve. The pressure in the balancing accumulator 24 is increased as a result of its holding additional hydraulic fluid.

If a number of spring systems are provided for the respective wheels of a vehicle, the regulation of a number of structure degrees of freedom—such as swaying, dipping, bracing, lifting oscillations and level regulation—is achievable.

The pump/motor device 14 also ensures good emergency running behavior for the case in which the regulation is taken out of operation. Because of the inertia of the device, the pump 16 acts as a restrictor 11, so that the fluid flows in the connecting line 7 are restricted and oscillations are damped. At the same time, the pump/motor device 14 acts in a frequency-selective manner, in that only oscillations with frequencies below the inherent frequency of the pump/motor device 14 are transmitted to the balancing accumulator 24. Such low-frequency oscillations normally corresponds to vertical structure oscillations in the frequency range up to about 3 Hz, which are responded to by the soft spring behavior of the balancing accumulator. Above the inherent frequency, oscillations of higher frequency are led to the elastomeric accumulator 9, if appropriate also to the gas accumulator 3 arranged in parallel with the elastomeric accumulator 9.

If the motor-operated pump 16 is not driven actively, but operates in the passive mode and acts as a restrictor 11 for the fluid stream expelled from the setting element, the electric motor 15 can be operated as a generator. In order to improve the emergency running behavior in the passive mode, the electric motor 15 can be short-circuited, and the damping in the springing system 1 is improved by the increased resistance.

In another embodiment, the pump 16 of the pump/motor device 14 can also be operated by the internal combustion engine of the vehicle, in which the regulation of the springing system is made by a volume flow regulating system.

In the case of purely passive operation, the pump/motor device 14 can also be replaced by a restrictor.

The springing system 1 forms a hydraulically sealed, autonomous system, in which the pump 16 permanently runs as well during each movement of the actuator 2, both in the active and in the passive mode.

Figure 2:
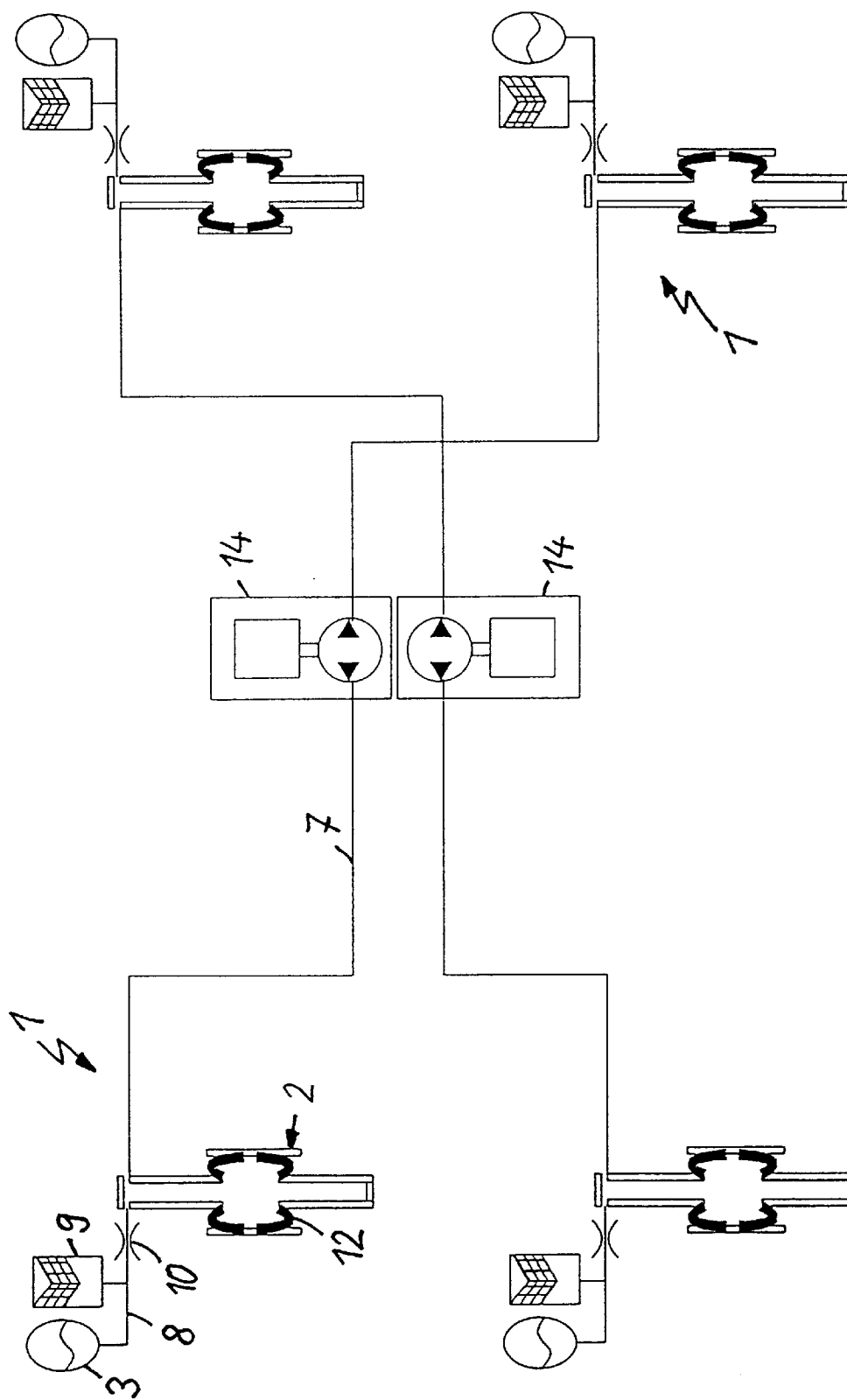
FIG. 2 is a schematic illustration of such a springing system but for the entire vehicle.

FIG. 2 shows a number of modularly constructed, intrinsically identically individual springing systems 1, which are connected together to form an overall springing system. Each springing system 1 comprises an actuator 2 which is constructed as a bellows 12 and, via the connecting line 8, in which a restrictor 10 is arranged, communicates with the parallel-connected accumulators, the gas accumulator 3 and the elastomeric accumulator 9. In each case, two diagonally opposite springing systems 1 are coupled together via the connecting line 7, which is led through a pump/motor device 14, so that either the springing systems front left and rear right or front right and rear left are acted on by a common pump/motor device 14. In this circuit, both the swaying behavior and the dipping behavior of the vehicle can be favorably influenced.

Figure 3:
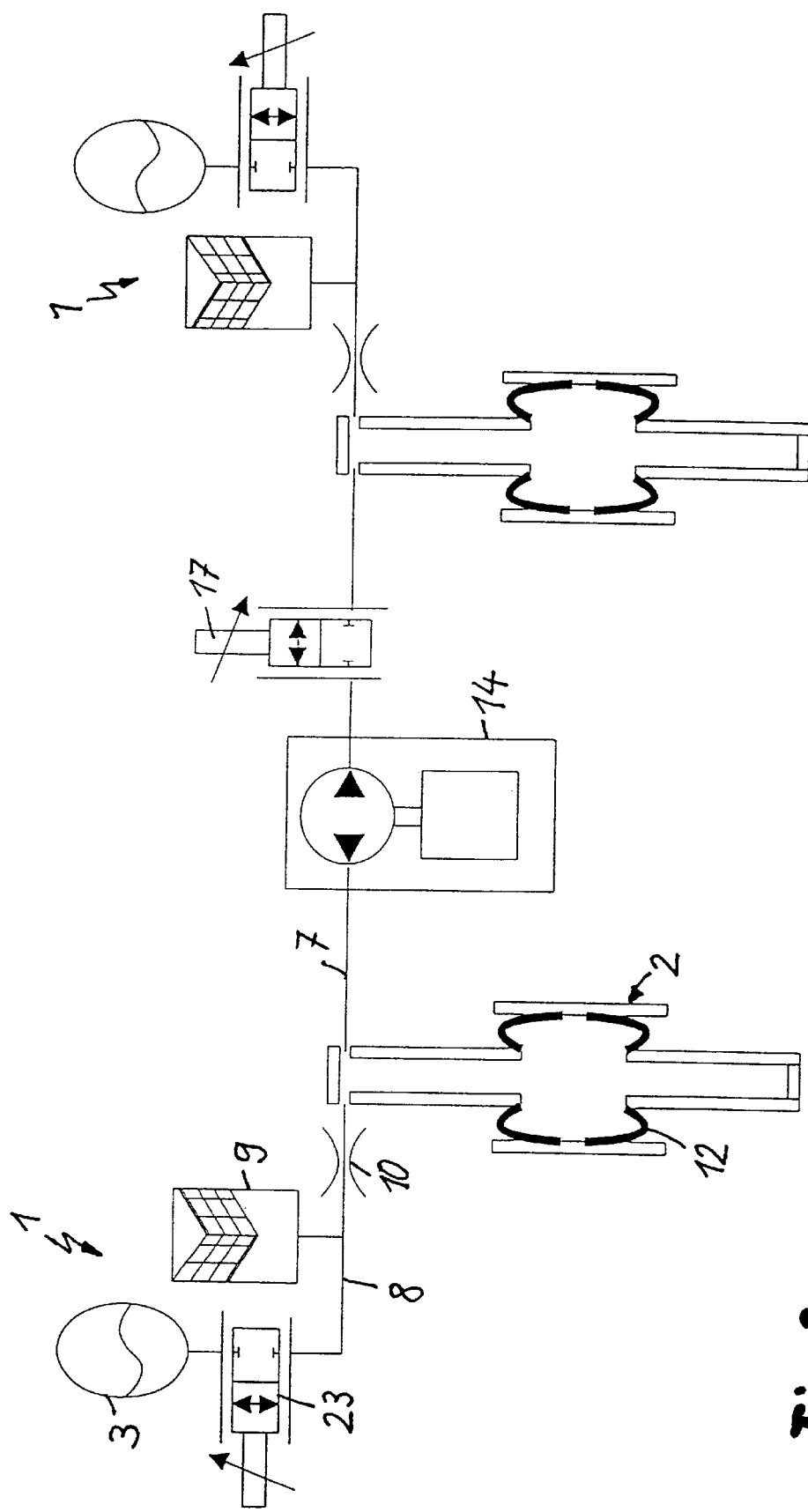
FIG. 3 shows an is a schematic illustration of another embodiment of a springing system for the entire vehicle.

The overall system illustrated in FIG. 3 is built up in each case from two individual springing systems 1 connected together axle-by-axle. Both on the front axle and on the rear axle, two intrinsically identical individual springing systems 1 are coupled together via the connecting line 7 and the pump/motor device 14. The connection can be interrupted via an emergency shut-off valve 17, which is arranged in the connecting line 7, in the event of failure of the regulation, so that each individual springing system operates intrinsically autonomously. Each springing system 1 comprises an actuator 2 constructed as a bellows 12, a gas accumulator 3 which can be shut off via a shut-off valve 23, and an elastomeric accumulator 9. Arranged in the connecting line 8 between the accumulators 3, 9 and the actuator 2 is a restrictor 10. The shut-off valve 23 can be operated to shut off the gas accumulator 3, for example under high curve dynamics.

In the exemplary embodiments according to FIGS. 2 and 3, each pump/motor device 14 can be assigned a balancing accumulator.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Vehicle springing system having at least one hydraulic actuator, a plurality of gas accumulators, each with an associated holding chamber for hydraulic fluid and a separate gas chamber, the gas accumulators operatively communicating with the actuator via a connecting line, and an elastomeric accumulator operatively connected to the actuator via the connecting line wherein the elastomeric accumulator is arranged in parallel with the gas accumulators, and the elastomeric accumulators and the gas accumulator are connected to the actuator via the connecting line, one of the gas accumulators being operatively associated with the elastomeric accumulator and another of the accumulators being configured as a balancing accumulator, the balancing accumulator and the elastomeric accumulator being arranged to be acted on in a frequency-selective manner.

2. Springing system according to claim 1, wherein a restrictor is operatively arranged in the connecting line between the elastomeric accumulator and the actuator.

3. Springing system according to claim 2, wherein the restrictor is a fixed restrictor.

4. Springing system according to claim 1, wherein a restrictor is operatively arranged in the connecting line between the gas accumulators and the actuator.

5. Springing system according to claim 1, wherein the actuator is a bellows.

6. Springing system according to claim 5, wherein the bellows is a rolling bellows.

7. Springing system according to claim 5, wherein the bellows is a folding bellows.

8. Springing system according to claim 1, wherein a pump/motor device is operatively arranged in a flow path between the balancing accumulator and the actuator.

9. Springing system according to claim 8, wherein the balancing accumulator and the elastomeric accumulator are operatively arranged in separate connecting lines, and the pump/motor device is configured to act on the balancing accumulator and the elastomeric accumulator.

10. Springing system according to claim 8, wherein the pump/motor device is configured to be regulatable.

11. Springing system according to claim 8, wherein the pump/motor device includes an electric motor.

12. Springing system according to claim 11, wherein the electric motor is configured to be speed regulated.

13. Springing system according to claim 8, wherein the pump/motor device is operated by a vehicle internal combustion engine.

14. Springing system according to claim 13, wherein the pump/motor device is configured to be subject to volume flow regulation.

15. Springing system according to claim 8, wherein actuator, the gas accumulators, the elastomeric accumulator and the pump/motor device are configured as a sealed hydraulic system.

16. Springing system according to claim 8, wherein the pump/motor device is common to at least two actuators.

17. Springing system according to claim 16, wherein the at least two actuators are arranged in parallel between wheels of a common vehicle axle, and the pump/motor device is arranged to act on vehicle structure.

18. Springing system according to claim 16, wherein the at least two actuators are located diagonally opposite on front and rear vehicle axles and are configured to be acted on by the pump/motor device.

19. Springing system according to claim 16, wherein an emergency shut-off valve is operatively arranged between the at least two actuators to interrupt a flow path therebetween.

20. Springing system according to claim 16, wherein the balancing accumulator is common to the at least two actuators.

* * * * *